US009290332B2

(12) United States Patent
Beer et al.

(10) Patent No.: US 9,290,332 B2
(45) Date of Patent: Mar. 22, 2016

(54) DEVICE AND METHOD FOR HORIZONTAL MOVEMENT OF LAYERS OF ARTICLES BETWEEN ADJACENT CONVEYOR MODULES

(71) Applicant: Krones AG, Neutraubling (DE)

(72) Inventors: Erhard Beer, Ebbs (AT); Martin Osterhammer, Frasdorf (DE); Georg Schweighofer, Oberaudorf (DE)

(73) Assignee: Krones AG, Neutraubling (DE)

( * ) Notice: Subject to any disclaimer, the term of this patent is extended or adjusted under 35 U.S.C. 154(b) by 3 days.

(21) Appl. No.: 14/483,830

(22) Filed: Sep. 11, 2014

(65) Prior Publication Data

US 2015/0068870 A1 Mar. 12, 2015

(30) Foreign Application Priority Data

Sep. 12, 2013 (DE) ......................... 10 2013 218 251

(51) Int. Cl.
*B65G 47/26* (2006.01)
*B65G 47/52* (2006.01)
*B65G 47/84* (2006.01)
*B65G 57/24* (2006.01)

(52) U.S. Cl.
CPC .............. *B65G 47/52* (2013.01); *B65G 47/845* (2013.01); *B65G 57/245* (2013.01)

(58) Field of Classification Search
CPC ........... B65G 2201/0244; B65G 47/82; B65G 57/24; B65G 47/52; B65G 47/26; B65G 47/32; B65G 47/66
USPC .......................... 198/600, 432, 435, 433, 429
See application file for complete search history.

(56) References Cited

U.S. PATENT DOCUMENTS 3,516,128 A * 6/1970 Lehner .......................... 425/345
6,843,360 B2 * 1/2005 Peterman et al. ............. 198/429
7,348,591 B2 * 3/2008 Yamauchi et al. ................ 257/9
8,348,591 B2 * 1/2013 Perl ............................ 414/789.5

FOREIGN PATENT DOCUMENTS

DE 31 07 495 A1 11/1982
DE 28 41 195 C2 6/1984
DE 2841 195 C2 6/1984

(Continued)

OTHER PUBLICATIONS

German Search Report for DE 10 2013 218 251 dated Mar. 26, 2014.

(Continued)

*Primary Examiner* — James R Bidwell

(74) *Attorney, Agent, or Firm* — Dennemeyer & Assoc., LLC.

(57) ABSTRACT

The invention concerns a method for horizontal movement of groups or layers of articles from a first support level of a first conveyor module to a vertically movable second support level of a second conveyor module immediately downstream of the first conveyor module in the direction of transport or transfer, in particular by means of a transfer device that remains spatially associated with the first conveyor module during the transfer. Shortly before or after reaching a final position of the transfer device, the respectively transferred group or layer of articles is moved in the direction of transport on the second conveyor module by means of a support surface horizontally movable relative to this second conveyor module and/or centered on the second conveyor module before or during its vertical hoisting movement.

20 Claims, 11 Drawing Sheets

(56) References Cited

FOREIGN PATENT DOCUMENTS

| | | | |
|---|---|---|---|
| DE | 10 2008 015 278 | A1 | 10/2009 |
| EP | 1 321 396 | A1 | 12/2002 |
| EP | 1 908 709 | A1 | 4/2008 |
| EP | 2 639 165 | A1 | 9/2013 |
| EP | 2 825 490 | A1 | 1/2015 |
| NL | 8 801 528 | A | 1/1990 |
| WO | 2013/038102 | A1 | 3/2013 |

OTHER PUBLICATIONS

European Search Report for EP 14 17 9907 dated Feb. 11, 2015.

* cited by examiner

DEVICE AND METHOD FOR HORIZONTAL MOVEMENT OF LAYERS OF ARTICLES BETWEEN ADJACENT CONVEYOR MODULES

FIELD OF THE INVENTION

This invention concerns a method for horizontal movement of groups or layers of articles between adjacent conveyor modules having the characteristics of independent method claim 1. The invention further concerns a related device having the characteristics of independent claim 7.

BACKGROUND OF THE INVENTION

To palletise groups or layers of articles, the articles normally first pass through a grouping station in which the articles initially transported in one or more consecutive rows are moved and/or grouped into palletisable layers. These palletisable layers must be transferred to a suitable loading station capable of carrying out raising movements. The loading station then deposits these layers of articles in a desired place, e.g., a stacking area and a pallet located thereon. The supply and grouping stations may optionally constitute a single unit and/or be directly coupled. The supply and/or grouping station comprise a support surface or level on which the articles are grouped and combined into a layer. The loading station also comprises a support level that may consist of one, two, or more parts. In a support surface of the loading station consisting, e.g., of two parts, the support surface consists of two supports or transfer plates, which are closed when loaded and then subsequently opened during the removal or depositing phase to deposit the layer of articles on a stacking area or pallet. Numerous variants are known to persons skilled in the art, e.g., jalousie gripper heads, etc. Such a palletising method using a prior-art palletising device operates such that, first, articles are grouped into a palletisable layer by means of a grouping device and then transferred from a supply area or supply station to the loading station. To this end, it is necessary for the loading station, e.g., a jalousie gripper head arranged on a hoist element or a robot, to be connected to the supply area so that the layer of articles can be transferred to the loading station. The jalousie gripper head or loading station remains in place until the layer has been completely transferred from the supply station to the loading station. If the layer of articles is completely in the loading station, the loading station positions the layer of articles on a desired transfer point, normally on a pallet provided in a stacking area, by horizontal and vertical movements. Then, the same procedure repeats until the desired number of layers has been placed on the pallet.

DE 10 2008 015 278 A1 discloses a device for loading pallets with piece goods with a piece goods supply station and a transfer device to transfer the group of piece goods from the supply station to a pallet provided on a stacking area and/or a layer of piece goods that has already been transferred to the pallet. EP 1 321 396 A1 discloses another palletising device in which articles are moved laterally and thereby grouped in an unsorted fashion by a horizontal conveyor device before being transferred to a hoisting device in complete layers. The hoisting device or transfer platform serves to compensate for differences in height between the grouping station and the loading station that stacks the layers on top of one another and deposits them on a pallet by opening a retractable floor.

EP 1 908 709 A1 discloses a method and a device for receiving and repositioning bundles. The device has a support for the bundles with an open front side for the insertion of the bundles. A moving slide serves to transfer the bundles in a horizontal receiving direction through the open front side.

Various variants are known from the prior art that are suitable to stack articles assembled in layers on a pallet. However, the prior art methods and devices share the disadvantage that, in order to transfer the layer of articles from a supply station or transfer platform into/onto a loading station, the support surfaces of those elements must be fixed and cannot move vertically and/or horizontally during the transfer of the layer of articles. This can result in time loss in the sense that the beginning of the transfer of the layer of articles can only take place once the loading station or transfer platform has been completely positioned and brought to a stop. As such, it is always necessary to wait until the loading station has reached the stationary supply station before the transfer of the layer of articles can begin. When a transfer platform is used, it is also necessary to wait until the transfer platform has reached the current position of the loading station. Only then can the transfer of the layer of articles begin. Additionally, the respective stations do not execute any vertical and/or movements during the transfer of the layer of articles until the layer of articles has been completely transferred. Either the loading station is moved in to the next respective transfer position only after transferring the layer of articles, or the loading station is already in the next desired transfer position at the time the layer of articles is being transferred.

A primary objective of this invention is to reduce the transfer times between consecutive stations in stationary and/or vertically movable support levels of consecutive stations of a transport system. In this regard, the times between depositing a layer of articles and receiving another layer of articles are to be minimised.

This objective is met by the subject matter of the independent claims substantially by increasing the degrees of freedom of movement of at least one of the consecutive conveyor modules of a transport system. In this way, the transport of layers of articles within a conveyor line can be accelerated such that the movable support surfaces of the modules need not necessarily come to a stop; instead, an oscillating horizontal movement of one support level of one loading station allows the transfer of a layer of articles to begin earlier than had previously been the case. Additionally, a final portion of the transfer movement may be carried out in the area of the loading station whilst it already induces a vertical hoisting movement to place the transferred layer of articles in a deposit area.

SUMMARY OF THE INVENTION

It should be emphasised that, in the following description and the claims, the terms ‘supply station’, ‘loading station’, and ‘transfer station’ are replaced by the term ‘module’ or ‘conveyor module’ for simplicity. Each of these stations is associated with at least one support surface or level that is suited to receive a layer of articles. Thus, for example, the support level or surface of the loading station may consist of two parts. However, the support levels or surfaces of the supply station and/or the transfer station normally consist of one part. Additionally, it would be possible for each of the support surfaces or levels to consist of driven, circulating modular belts, roller conveyors, etc.

To meet the aforementioned objectives, the invention proposes, on the one hand, a method for horizontal movement of groups or layers of articles from a first support surface or level of a first conveyor module to a vertically movable second support surface or level of a second conveyor module immediately downstream of the first conveyor module in a direction of transport. The transfer can be carried out, e.g., by means of a suitable transfer device by which the group or layer of articles can be transferred in the direction of transport between the two support levels of the two conveyor modules, which are approximately aligned at least during the transfer. This transfer device may engage the rear of group or layer of articles, in particular in the direction of transport, and consist, e.g., of a transfer bar or the like.

Such a transfer bar may carry out, e.g., a circulating movement between its two stop positions, which are normally within an outline of the first conveyor module. Thus, a first stop position may be characterised in that the circulating transfer bar drops behind a layer of articles transferred to the first conveyor module and transfers them horizontally in the direction of transport to the second conveyor module. The transfer bar executes a horizontal pushing movement in the direction of transport and is at all times at the height of the layer of articles to be transferred. As soon as it has reached its second stop position—which may be described as the final position—its horizontal pushing movement ends. Normally, the second stop position is also within the outline of the first conveyor module, such that the range of movement of the transfer bar does not extend into the area of the second conveyor module, even when the second support level has been moved entirely in the direction of the first conveyor module. As soon as the layer of articles has been completely transferred to this second support level, the transfer bar may be pulled vertically upward and returned above the transport level of the layers of articles in a horizontal return movement to its first stop position, where the transfer bar can again be lowered to the transport level of the layers of articles. Normally, the next layer of articles to be transferred is already waiting there. These endless, repeated circulating movements of the transfer bar of the transfer device may be carried out, e.g., by endlessly circulating pulling devices on which the transfer bar is guided laterally.

A transfer frame encompassing the group or layer of articles on two, three, or all sides may also be suitable as a transfer device. During the entire transfer process, the transfer device remains spatially associated with the first conveyor module, i.e., it does not protrude into the outline of the second conveyor module, but rather, at most, borders on the edge thereof or a boundary or partition line or gap between the first and second conveyor module in its final or stop position. Thus, the second conveyor module may already initiate its upward or downward hoisting movement when the last row of the group or layer of articles transferred is on the second conveyor module, without the already beginning vertical movement creating the risk of a collision with the transfer bar or an element of the transfer device. The transfer device or transfer bar may be returned immediately after the transfer of the group or layer of articles to the second conveyor module—also referred to in this regard as the second stop position of the transfer device or transfer bar—to its initial position, which is also referred to in this regard as the first stop position. This horizontal return movement against the direction of transport into the first stop position is carried out advantageously above or below the transport level in order to ensure that another group or layer of articles already present on the first conveyor module cannot collide with the returning transfer device or transfer bar. In order to increase the processing speed, e.g., two or more such transfer bars may be arranged on an endlessly circulating pull drive and thus alternate in being prepared for the transfer of a layer of articles to the second conveyor module and for the return into the first stop position.

According to the invention, shortly before or after reaching the stop position of the transfer device (in the direction of transport) on the second conveyor module, the groups or layers of articles transferred are moved by means of a horizontally movable support surface and/or centred on the second conveyor module before or whilst the second conveyor module carries out a vertical hoisting movement in order to deposit and/or stack the layer or group of articles in its specified deposit or stacking area. By means of these oscillating movements of the support level of the second conveyor module—over the course of consecutive transfer movements of several groups or layers of articles—waiting times of this second conveyor module may be reduced, because the movable support level allows the transfer process to be completed whilst a raising or lowering movement of the second conveyor module can already begin. This makes it possible to dispense with the waiting period that was previously necessary until the transfer device or a layer slide could be returned to its other end position and removed from the area of collision with the second conveyor module or loading station.

The vertical movement of the second conveyor module or its support level, which can already occur during the final phase of the transfer movement of the layer or group of articles, allows for reduction or minimisation of the necessary time from the transfer of the layers of articles to the deposit of the layers of articles, thus contributing to temporal overlap or synchronicity of individual steps necessary for palletising layers of articles. This temporal and/or procedural overlap of individual steps saves time, thus making a substantial contribution to increased output of the palletising method influenced thereby. For persons skilled in the art, it is obvious that the relative positions of a plurality of articles forming the group or layer of articles can be approximately maintained during this horizontal transfer.

In the method according to the invention, the second conveyor module is additionally associated with a support level capable of horizontally moving and/or oscillating between two final positions, which is in its first final position at the start of a transfer movement of the group or layer of articles. This first final position is characterised in that the support level is nearer to the first conveyor module here than in a second final position in which the support level is at a greater distance from the first conveyor module. Additionally, the method provides for the horizontally movable support level to be brought into the first final position, in which it approaches or contacts the first conveyor module, or at least partially abuts its surface, at least shortly before the beginning of the transfer process of the group or layer of articles to the second conveyor module. Additionally, the horizontally movable support surface of the second conveyor module or loading station may move towards the second conveyor module as the transfer device approaches or reaches a margin of the first conveyor module adjacent to the second conveyor module, whereby the second support level moves parallel to the direction of transfer. The layer slide or transfer device may thus move up to the edge of the first support level, such that the edge of the second support level is not yet reached or overlapped. Because, in this way, the group or layer of articles cannot yet be pushed into the middle of the second support level of the vertically movable second conveyor module, the second support level, which is movable horizontally and relative to the second conveyor module, takes over the remaining transfer path by executing a relative movement parallel to the direction of transport, which must be preceded before the transfer movement by a corresponding, opposing relative movement.

In the method according to the invention, it is provided for the horizontal transfer of the group or layer of articles to occur whilst the first and second support levels of the first and second conveyor modules are nearly at the same level. To ensure this alignment of the first and second support levels of the first and second modules, the support levels must be at rest at least during the pushing movement of the layer pusher or transfer device and not move vertically relative to one another. Rather, according to the method according to the invention, during and shortly before the completion of the transfer of each layer of articles, a horizontal movement of the second support level occurs, which can be combined with a beginning upward or downward vertical movement of the second conveyor module or its second support level. The advantage of this method is, in particular, that there is no need to wait for the end point of the transfer of a layer of articles from a first support surface of a first module to a second support level of a second module in order to begin a vertical movement of the second support level. Thus, during the final phase of a transfer movement the vertical positioning of the second conveyor module or loading station is already occurring in order to reach, e.g., a depositing position for depositing, stacking, and/or palletising the layer or group of articles. Thus, the transfer processes may be carried out overall—i.e., in the sum of the necessary steps—in less time or at higher speed.

In a variant of the method according to the invention, it is also entirely possible for the first support level of the first conveyor module to be slightly lower or higher at least temporarily or in certain phases than the second support level of the subsequent conveyor module, thus creating a step. In this case, the articles may be pushed upward or downward onto the subsequent, second module, e.g., via a small ramp. This variant allows for the transfer process to begin even earlier, before the support levels are completely aligned, which may also save time for the transfer process, and thus the entire palletising process. Of course, it is also possible for the support levels to be substantially aligned even before contacting the second support level with the transferred articles, and to this end to have reached the same height.

On the other hand, the various variants of the method according to the invention, due to the coordinated vertical control of at least the second support level of the second module downstream of the first conveyor module, allows for the transfer of the group or layer of articles from the first support level of the first module to the second support level of the second module to begin immediately before the formation of the common support level of the first and second support levels, or simultaneously with this phase. Because the foremost articles of a complete layer of articles are normally not on the outermost front edge of the first support level, the transfer movement may already begin in the absence of a common support level. The level need only be formed at least approximately, possibly with a slight step, once the first articles actually cross the boundary between the two support levels and are pushed onto the second support level of the second module. Additionally, the first support level of the first module and the second support level of the second module must form the aforementioned common support level at least long enough for the group or layer of articles to be completely transferred to the second support level located in its corresponding final position. The common support level may thus be separated immediately after the hindmost row of the complete layer of articles has passed, e.g., due to the second support level of the second module carrying out an overlapping horizontal and vertical movement in order to approach the deposit or stacking area.

Preferably, the method provides for the support level of the second conveyor module to consist of a plate movable horizontally between its two final positions, having a surface corresponding at least to the base surface area of a group of articles to be received. Normally, however, the plate is at least slightly larger than the groups or layers of articles transported with it, since this is indispensable for sufficiently stable transport of similar articles or groups or layers of articles of differing sizes.

In the context of this invention, it is also important for the relative positions of a plurality of articles forming the group or layer of articles to be approximately maintained during the aforementioned horizontal movement of the group or layer of articles between the consecutive support levels. Therefore, the movement is executed by means of a suitable transfer device that can move the layer of articles between the two approximately aligned support levels of the two modules. The transfer device may consist in particular of a transfer bar or layer slide, etc., movable horizontally in the spatial area of the first conveyor module, which engages the rear (in the direction of transport) of the layers to be transferred, i.e., the respectively hindmost articles of the layers. At least the second conveyor module can be vertically positioned, e.g., with regard to a stack height of layers of articles already deposited on top of one another in a stacking area. The reduced transfer times and the ability to carry out the vertical movements at least of the second conveyor module already during transfer allow for the necessary transport times to be minimised, and contribute to increasing the attainable transport speeds.

In order to obtain the at least temporarily coordinated horizontal and vertical movements of the support levels of the first and second modules, it can be useful to permanently record the current vertical and/or horizontal positions of the support levels and of the layers of articles transferred, whereby the values recorded can be processed to calculate an approach in order to prepare the transfer process. The objective of this position recording and data processing is an optimally coordinated movement of the two support levels of the consecutive modules, thus minimising transfer times.

Additionally, provision may optionally be made for a support bar, which is at least temporarily associated with the articles in front in the direction of transport, and which runs slightly ahead of the front articles or abuts them at least briefly before reaching the resting position. The first module may consist, e.g., of a transfer unit or a transfer table with a vertically movable support level, whilst the second module may consist of a loading station that also comprises a vertically movable support level. An useful control rule may provide for a current vertical position of the loading station or of the second module to dominate the direction of a vertical movement of the transfer unit or of the first support level of the first module in order to bring the two modules or their support levels nearer to one another.

The layers of articles, which can be transferred at high speed between adjacent modules or hoist elements, may be stabilised by the interaction of the push bar pushing from behind and the optional support bar, which provides stability in the front, wherein the layer of articles may usefully be laterally guided in this conveyor section. By the action of the push bar in the rear and the lateral guides, relative positions of a plurality of articles forming the group of articles can be substantially maintained relative to one another, i.e., the configuration of the article group moved remains substantially intact. This can be achieved substantially by having the support bar—understood to be optional—run ahead of the group of articles with a small distance to the foremost articles or abut them at least briefly before reaching the resting position.

When articles or layers of articles are referred to in this regard, this may generally refer to widely varied packaged goods, e.g., individual cartons, beverage containers such as bottles, cans, or beverage cartons, piece goods, etc. that can be palletised, stacked, or depalletised in specified configurations. Articles may also include bundles, e.g., film-wrapped or strapped bundles, etc.

Additionally, it should be noted that, in another variant of the method according to the invention, the groups or layers of articles can be moved from the vertically movable second conveyor module to a vertically movable third conveyor module immediately downstream of the second conveyor module in the direction of transport. This optional third conveyor module may consist, in particular, of a vertically movable loading station, etc., whilst the second conveyor module may consist, e.g., of a transfer station. It may be provided here for the second conveyor module and the third conveyor module to rest at the same vertical height during the transfer of the group or layer of articles until the transfer has been completed. Optionally, however, it may also be provided for the second conveyor module and the third conveyor module to carry out synchronised vertical movements in the same direction during the transfer of the group or layer of articles, such that, in this way, the loading station or third conveyor module can already prepare for a subsequent depositing process of the layer of articles, e.g., into a specifically prepared stacking area with a pallet located in it or on top of a layer of articles already deposited there.

This invention further comprises a device for horizontal movement of groups or layers of articles between at least two support levels of adjacent conveyor modules whilst substantially maintaining the relative positions of a plurality of articles constituting the respective group or layer of articles. This device may, in particular, comprise a suitable transfer device for horizontal movement of the layers of articles to the vertically movable second support level of a second conveyor module downstream of the first module. According to the invention, the first and second support levels of the first and second modules are at least approximately aligned during the transfer process in order to allow for the unobstructed horizontal transfer of a group or layer of articles between the support levels of the modules. However, the second conveyor module has a support level that is horizontally movable and/or oscillates between two final positions, and which is positioned immediately adjacent or near to the first conveyor module in the first final position and at at least a slight distance from the first conveyor module and/or approximately centred relative to the second conveyor module in the second final position. This allows the transfer movements be carried out in the aforementioned accelerated manner, thus saving times due to the faster transfer processes. The second support level, which is horizontally movable relative to the second conveyor module, may consist, e.g., of a wooden support table or a support table having a wooden surface or a suitable structured surface, e.g., of plastic, having a sufficient coefficient of friction to prevent uncontrolled sliding of the articles or piece goods located on it during fast horizontal movements of the support table. On the other hand, the surface structure should be sufficiently smooth that it does not have too high a friction resistance to the transfer movements of the layer of articles. The horizontal movements of the second support level may range between a few centimeters and typically up to 20 or 25 cm, wherein an useful adjustment range may be app. 8 to 12 . . . 15 cm, in particular app. 10 cm. I.e. these centimeter values define the horizontal distance of the two final positions or final stops of the second support level.

Optionally, the device may provide for the first and/or second modules each to be associated with position sensors to detect the current vertical and/or horizontal positions of the first and second support levels, the values of which can be processed in order to calculate an approach to prepare a transfer process. Using these sensors, the vertical and horizontal positions of the support levels may be determined and coordinated in a control processing the signals of the sensors at any time, such that accelerated transfer movements are possible with simultaneous horizontal movements of the second support level and vertical movement of the second conveyor module supporting the second support level.

The first module may consist, e.g., of a transfer unit or a transfer table, or a grouping station or grouping table, with a fixed or vertically movable first support level, whilst the second module may consist, e.g., of a loading station with a vertically movable second support level. The second module may also consist, e.g., of a lift and/or a jalousie gripper head or another hoist element allowing for height compensation. In the context of this invention, height compensation refers, in particular, to the possibly of stacking during transfer of the layers of articles to one of the modules. Because the layers of articles are generally stacked in multiple layers during palletisation, the height of at least the second conveyor module must be adjustable. This height adjustability includes both the possibility of lowering to transfer the layers of articles on a lower level and the possibility of raising over the level of the first module or the grouping station in order to be able to deposit the layers of articles on top of layers of articles that have already been stacked. This applies accordingly to depalletisation, because a stack of multiple layers of articles to be depalletised gradually becomes smaller, requiring an adjustment of the height of the receiving module, as the removal progresses.

The transfer device may comprise at least one push bar engaging the articles and/or at least one support bar engaging the front of the layer of articles, the movements of which are at least temporarily coupled with the push bar, thus preventing tipping or slipping of articles during fast transfer or braking movements. Optionally, at least one of the push bars and/or at least one of the support bars may be coupled with an endlessly circulating pull drive to generate the pushing movements. However, other drives are also possible for the push and support bars, e.g., linear drives.

Additionally, it should be noted that the second, vertically movable conveyor module may also have a suitable transfer device in order to transfer the layer of articles there to another conveyor module not separately mentioned here, e.g., a loading station or the like. This additional transfer device associated with the second conveyor module may have relatively small ranges of movement, because only complete transfer to another conveyor element or downward movement of the layer of articles from the second conveyor module is required. Optionally, this movement of the layer of articles from the second conveyor module may also occur during its vertical movement, in particular with another conveyor module, e.g., a loading station capable of corresponding vertical movements synchronised with the second conveyor module immediately downstream of the second conveyor module.

The device according to the invention may optionally extend to an additional, third conveyor module, which may be immediately downstream of the second conveyor module in the direction of transport. Thus, in this additional variant of the invention, the groups or layers of articles may be moved from the vertically movable second conveyor module to the vertically movable third conveyor module. The optional third conveyor module, which is vertically movable like the second conveyor module, may consist, in particular, or a loading station or the like, whilst the second conveyor module may consist, e.g., of a transfer station. It may be provided here for the second conveyor module and the third conveyor module to rest at the same vertical height during the transfer of the group or layer of articles until the transfer has been completed. Optionally, however, it may also be provided for the second conveyor module and the third conveyor module to carry out synchronised vertical movements in the same direction during the transfer of the group or layer of articles, such that, in this way, the loading station or third conveyor module can already prepare for a subsequent depositing process of the layer of articles, e.g., into a specifically prepared stacking area with a pallet located in it, or on top of a layer of articles already deposited there.

Lastly, it should be noted that the device for transferring layers or groups of articles between the individual conveyor modules, described in this context as a transfer device, may optionally consist of specifically prepared support levels, e.g., by forming them as horizontal conveyor devices, modular belts, etc., by means of which the groups or layers of articles on them can be more easily transferred in the direction of transport to subsequent conveyor or support levels of other conveyor modules.

Figure 1A:
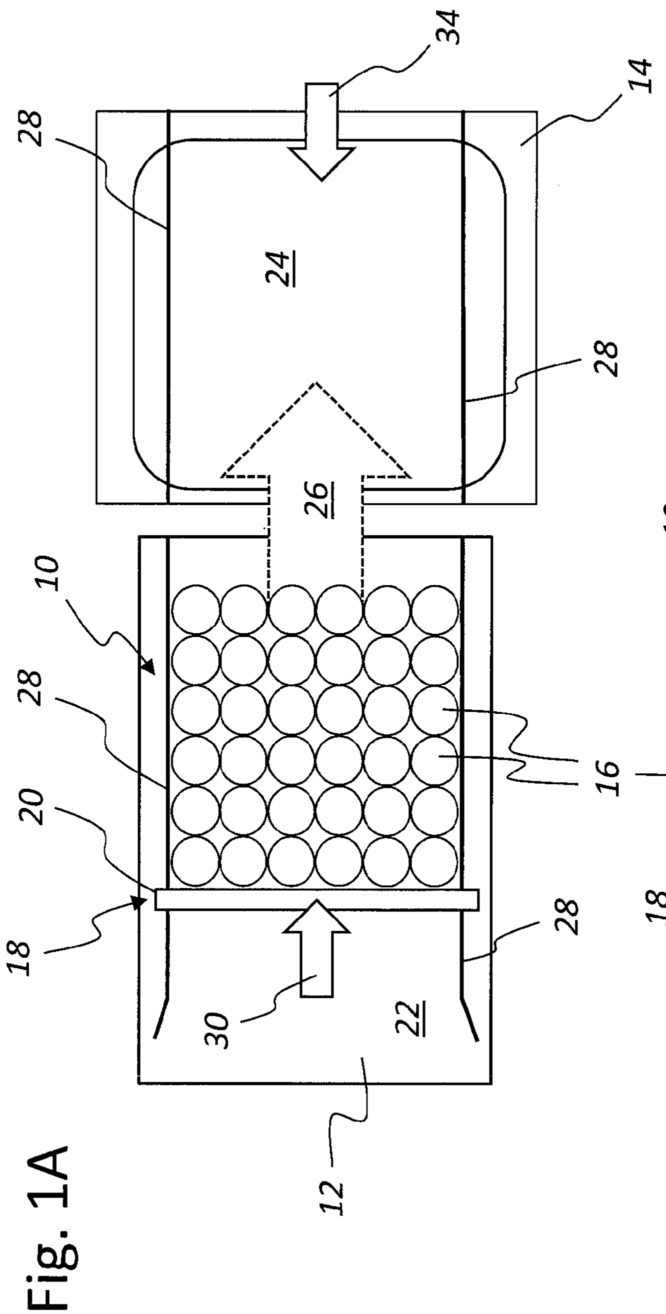
FIG. 1A shows a schematic views of the beginning of a movement transferring a layer of articles from a first conveyor module to an adjacent second conveyor module.

Exemplary embodiments of the invention and its benefits will be discussed in greater detail below by reference to the attached drawings. The size ratios of the individual elements to one another in the drawings do not always correspond to the actual scale, because some shapes are simplified and others are enlarged relative to other elements for ease of illustration.

FIG. 1 shows two schematic views of the beginning of a movement transferring a layer of articles from a first conveyor module to an adjacent second conveyor module.

FIGS. 2 to 9 show various consecutive schematic views of the steps of the transfer of a layer of articles between two adjacent modules.

Identical reference numerals are used to designate the same or functionally similar elements of the invention. Additionally, for ease of reference, only reference numerals required for the description of the respective drawing are included in each drawing. The embodiments shown are merely examples of possible configurations of the device or method according to the invention and are in no way intended as limitations thereof.

DETAILED DESCRIPTION OF THE ILLUSTRATIVE EMBODIMENT

Figure 1B:
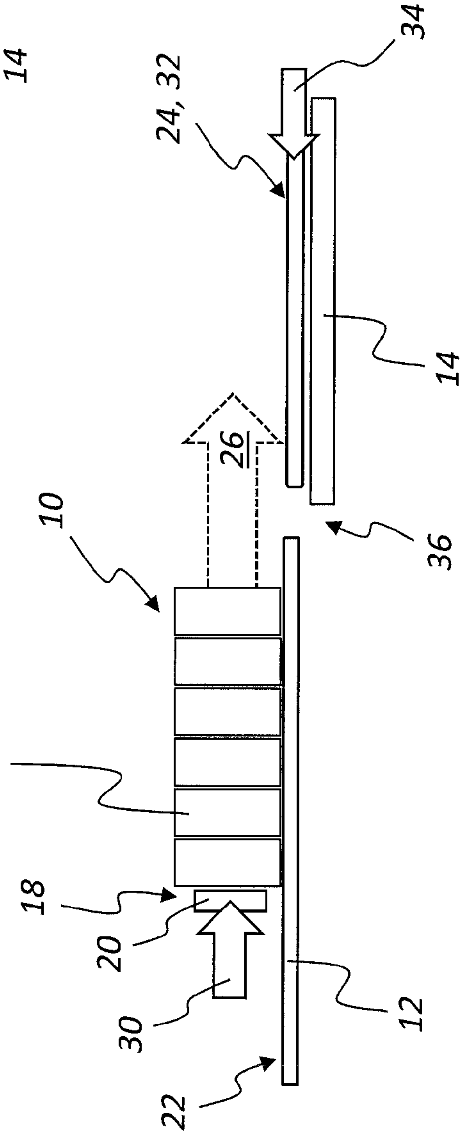
FIG. 1B shows a schematic views of the beginning of a movement transferring a layer of articles from a first conveyor module to an adjacent second conveyor module.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiment") relates to a requirement of the United States Patent Office, and should not be found to limit the subject matter disclosed herein. FIG. 1 shows a schematic top view (FIG. 1A) and a schematic side view (FIG. 1B) of the beginning of a horizontal movement of a group or layer of articles 10 from a starting position from a first conveyor module 12, e.g., a grouping table that may be part of a grouping system, into a final position on a second conveyor module 14, which may be a hoisting module, loading station, etc. In the exemplary embodiment shown, the layer of articles 10 comprises a regular configuration of a plurality of articles 16 in a rectangular group, to be transferred by means of a transfer device 18 in the form of push bar 20 from a first support level of the first conveyor module 12 to a second support level 24 of the second conveyor module 14 without changing the configuration. The articles 16 may be, e.g., cartons, bundles of several individual articles or containers, or individual containers standing adjacent to one another in a regular configuration.

The push bar 20 of the transfer device 18, responsible for pushing the group or layer of articles 10, engages the articles 16 in the rear of the group 10 in the direction of transport or feed 26, and thus moves the entire group or layer of articles 10, which may be laterally guided in order to maintain the layer configuration. The optional lateral guides are indicated with the reference numeral 28 in FIG. 1A and the following top views of FIG. 2A-9C. By the action of the push bar 20 in the rear and the lateral guides 28 arranged on either side of the transfer path, the relative positions of a plurality of articles 16 forming the group of articles 10 can be substantially maintained relative to one another, i.e., the configuration of the article group 10 moved remains substantially intact along the forward movement 26. In each of the schematic side views (FIG. 1B, etc.), the lateral guides 28 are omitted for ease of reference. The pushing movement of the push bar 20 of the transfer device 18 is indicated by the reference numeral 30. The pushing movement 30 is necessarily in the same direction as the transfer or feed movement 26 of the layer of articles 10 moved to the right by the transfer device 18.

It should be noted that any additional push bar 20 that is returned after a transfer (not shown) to its first final position at the beginning point of the first conveyor module 12, is not included in this representation. In order to avoid colliding with other subsequent layers of articles 10, such a return movement must occur above or below the first support level 22 of the first conveyor module 12.

Figure 2A:
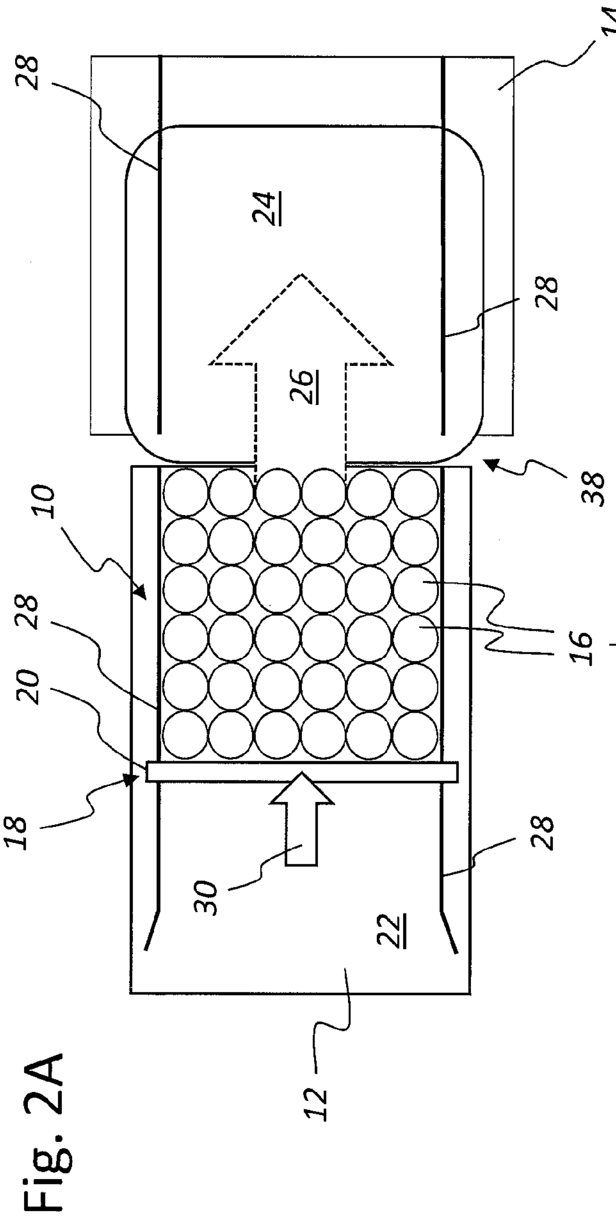
FIG. 2A shows a schematic view of the steps of the transfer of a layer of articles between two adjacent modules.
Figure 2B:
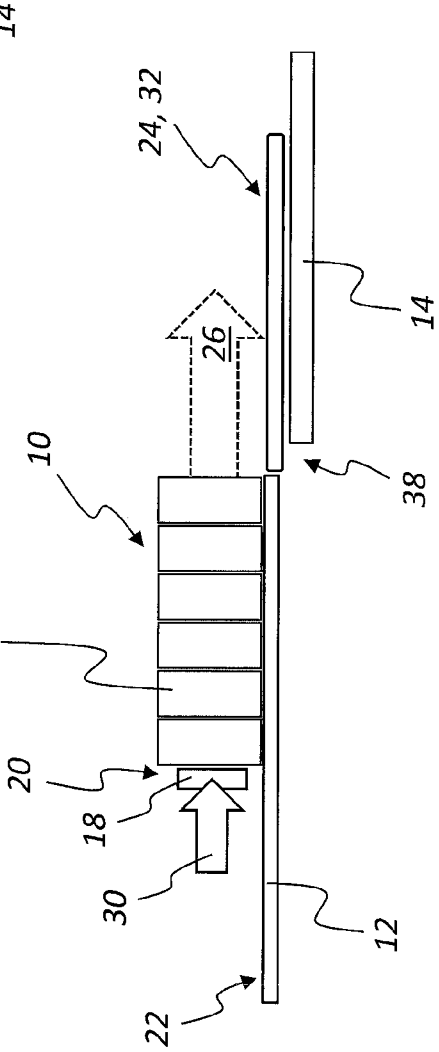
FIG. 2B shows a schematic view of the steps of the transfer of a layer of articles between two adjacent modules.
Figure 3A:
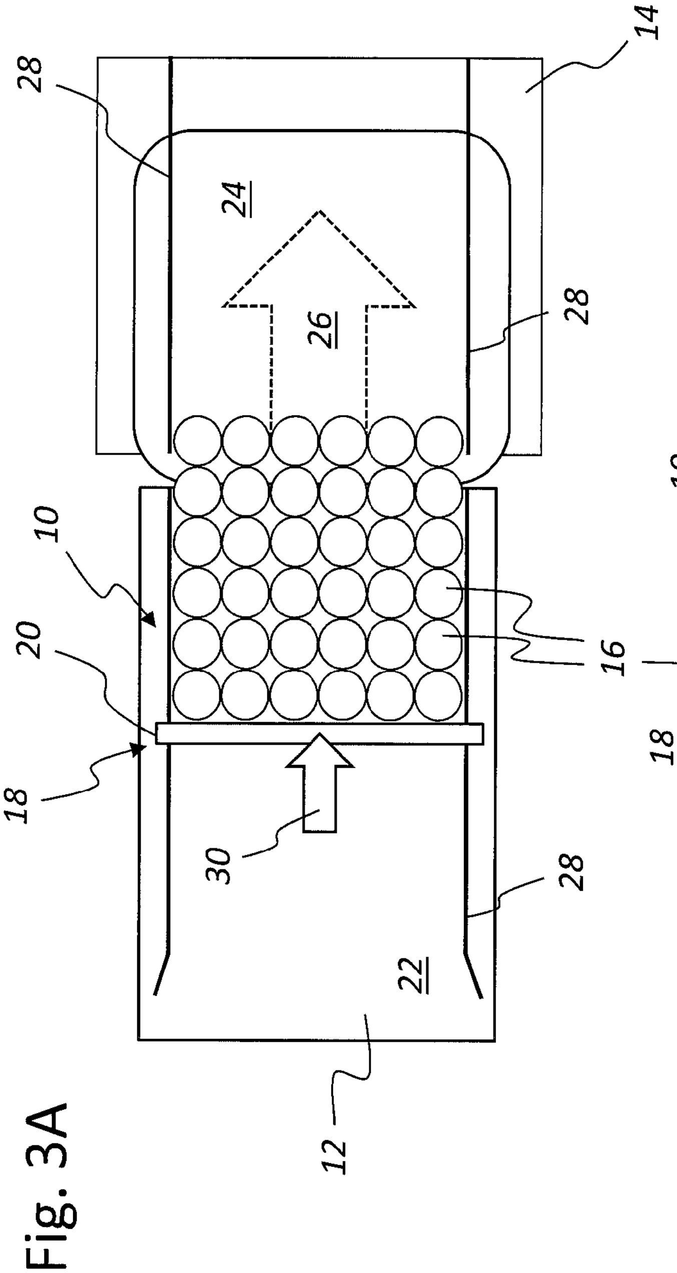
FIG. 3A shows a schematic view of the steps of the transfer of a layer of articles between two adjacent modules.
Figure 3B:
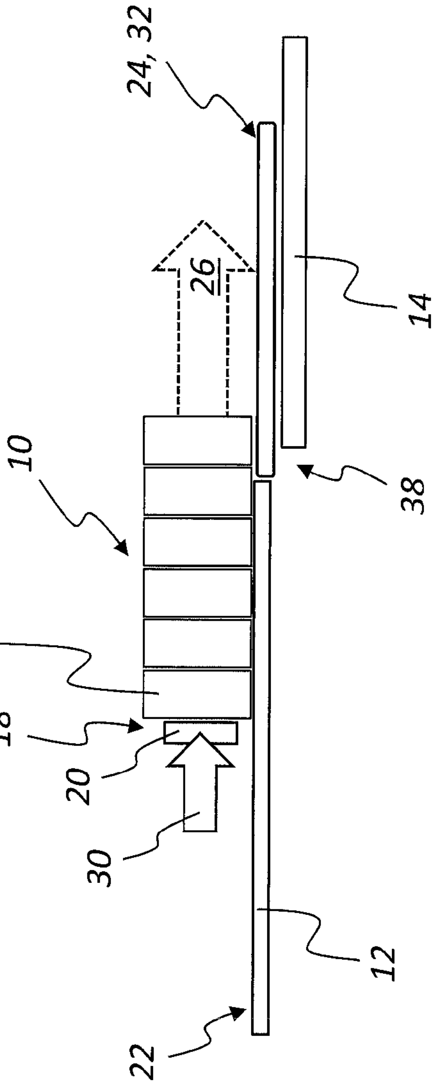
FIG. 3B shows a schematic view of the steps of the transfer of a layer of articles between two adjacent modules.
Figure 4A:
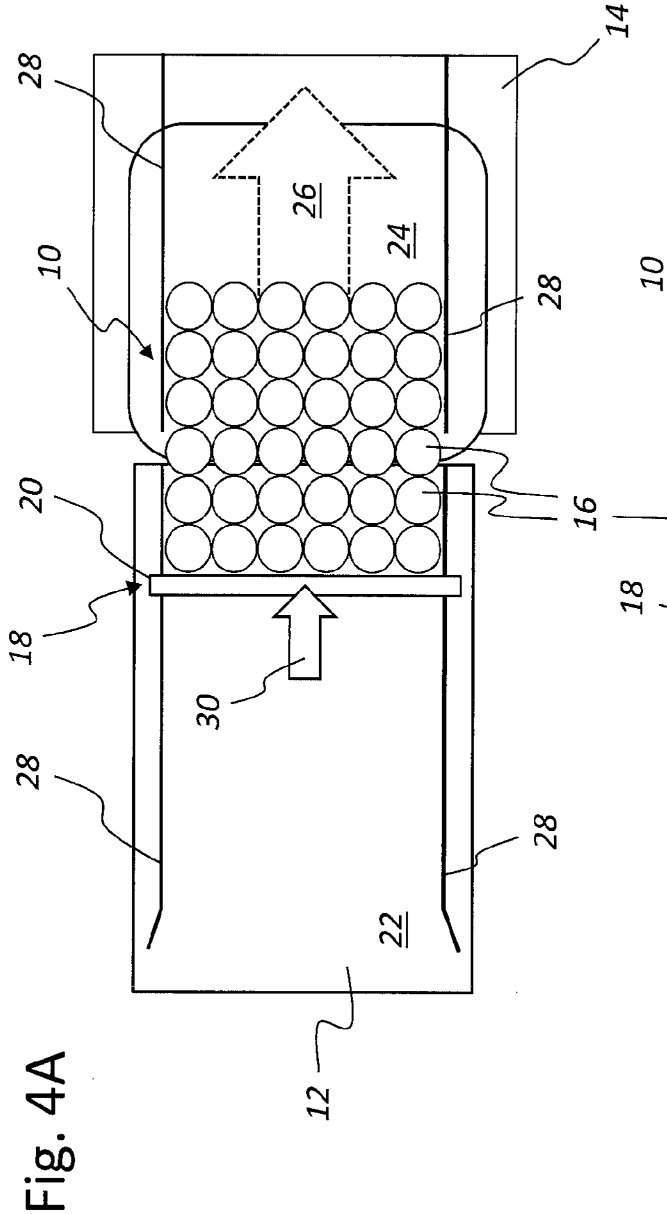
FIG. 4A shows a schematic view of the steps of the transfer of a layer of articles between two adjacent modules.
Figure 4B:
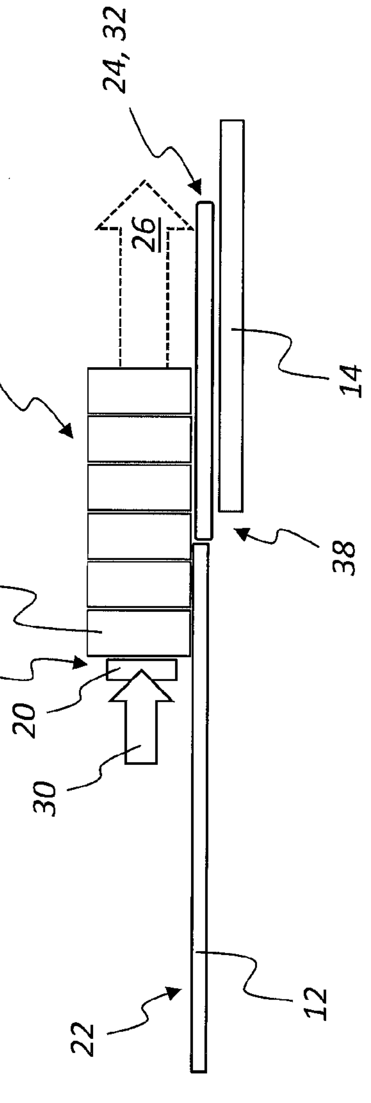
FIG. 4B shows a schematic view of the steps of the transfer of a layer of articles between two adjacent modules.
Figure 5A:
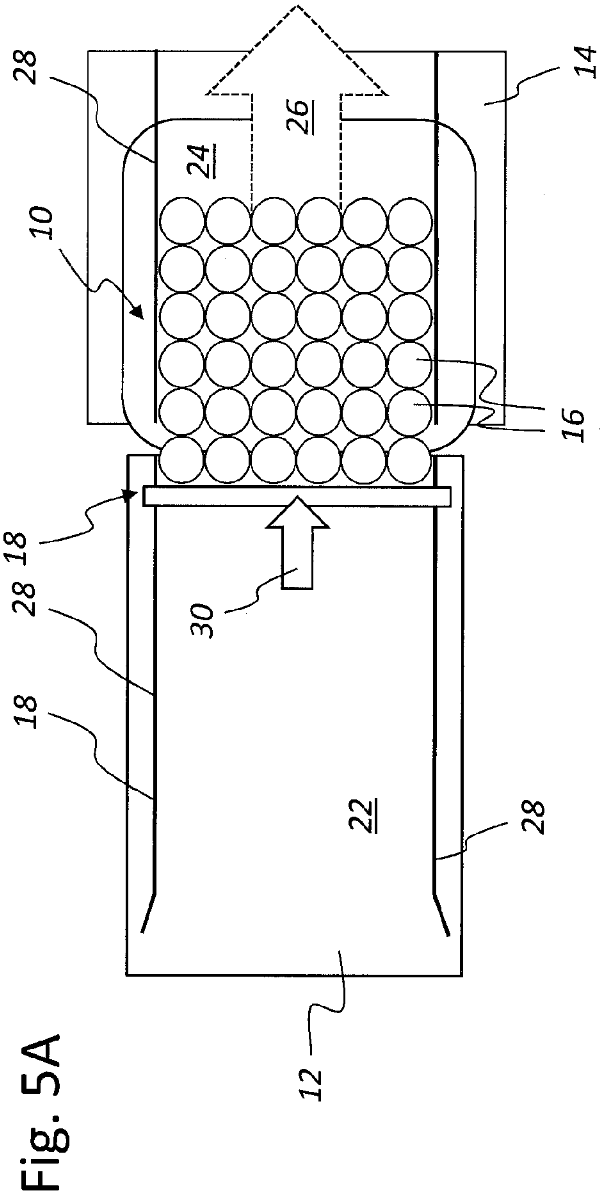
FIG. 5A shows a schematic view of the steps of the transfer of a layer of articles between two adjacent modules.
Figure 5B:
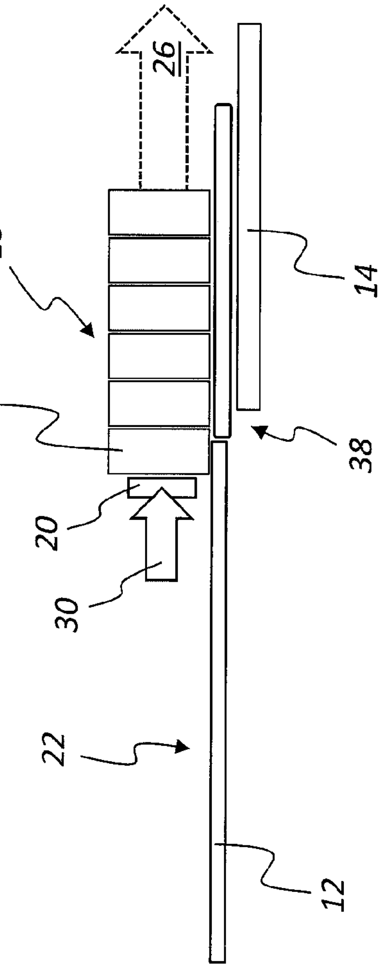
FIG. 5B shows a schematic view of the steps of the transfer of a layer of articles between two adjacent modules.
Figure 9A:
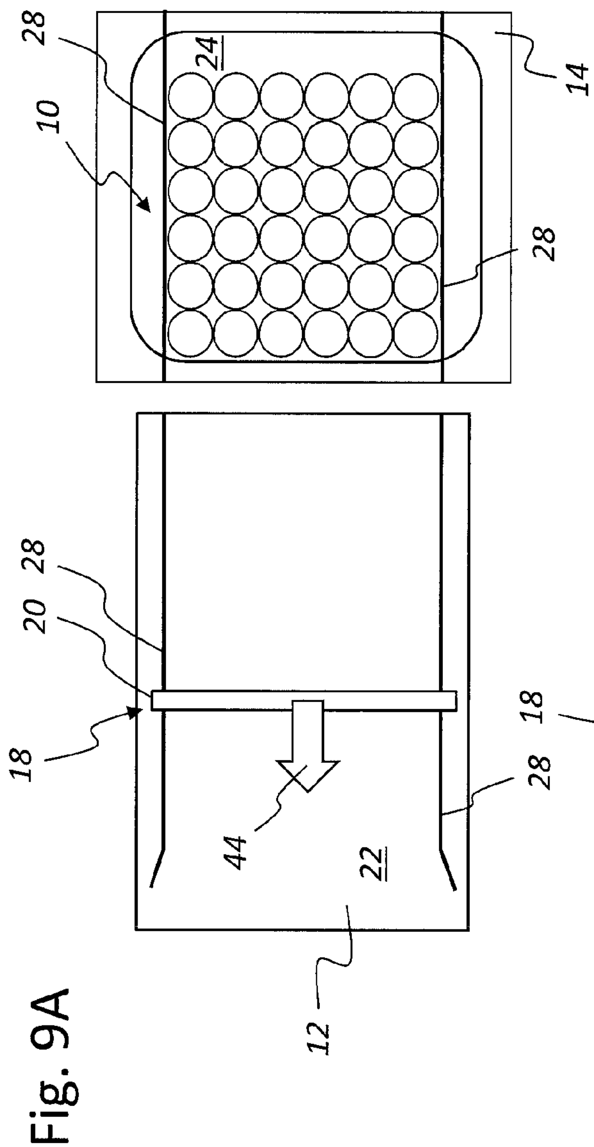
FIG. 9A shows a schematic view of the steps of the transfer of a layer of articles between two adjacent modules.
Figure 9B:
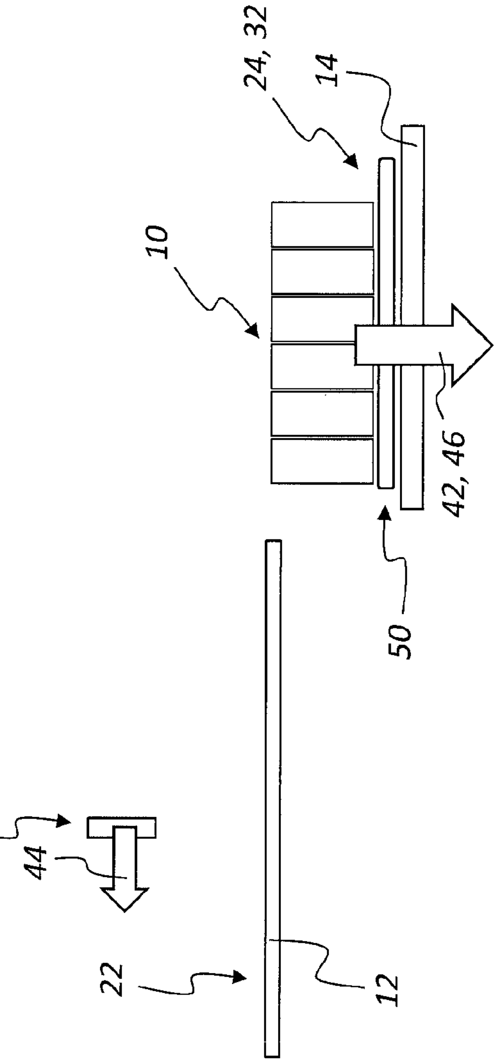
FIG. 9B shows a schematic view of the steps of the transfer of a layer of articles between two adjacent modules.
Figure 9C:
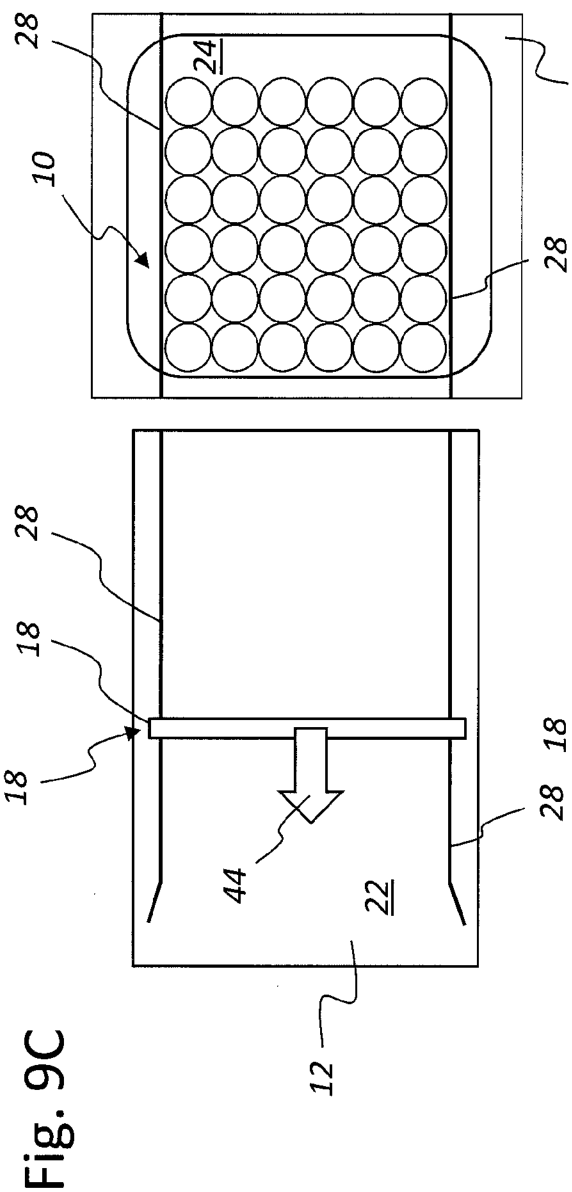
FIG. 9C shows a schematic view of the steps of the transfer of a layer of articles between two adjacent modules.
Figure 9D:
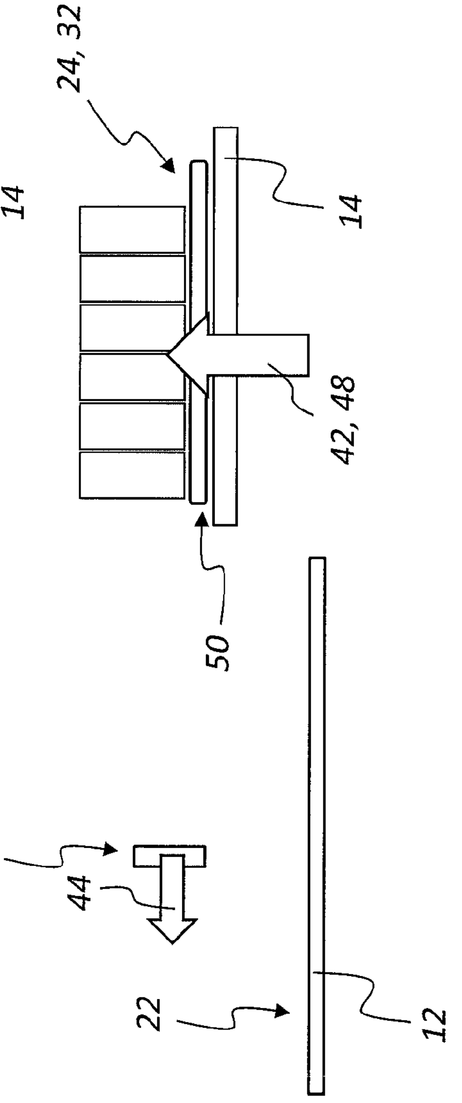
FIG. 9D shows a schematic view of the steps of the transfer of a layer of articles between two adjacent modules.

As can be seen in particular from the schematic side views of FIGS. 1B, 2B, 7B, 8B, and 9B, the second support level 24, which may consist, e.g., of a support table 32 made of wood or another suitable material, is mounted so as to be horizontally movable relative to the vertically movable second conveyor module 14. This horizontal relative movement may be between two final positions. A first final position is shown in FIG. 2B (as well as FIGS. 3B, 4B, 5B, and 6B), in which the second support level 24 or support table 32 is near the first support level 22 of the first conveyor module 12. On the other hand, the second final position shown in FIGS. 9B and 9D is characterised in that the support table 32 or second support level 24 is at a greater horizontal distance from the first support level 22.

FIGS. 1A and 1B illustrate a return movement 34 of the support table 32 with the second support level 24 in the direction of the first support level 22. The return movement 34 moving the support table 32 into the first final position is thus opposed to the direction of transport or feed 26 of the layer of articles 10. FIG. 2*a* et seq. show that the return movement 34 (FIG. 1A, 1B) has come to a stop because the support table 32 has reached its first final position near the first support level 22 of the first conveyor module 12. Because a gap 36 between the two adjacent support levels 22 and 24 is minimal here, the layer of articles 10 can be transferred from the first conveyor module 12 to the second conveyor module 14 substantially without difficulties and without the obstruction of a step. Another condition for this is that the support levels 22 and 24 are at the same vertical level and their surfaces are aligned with it, which is the case in FIG. 1A-7B.

Optionally, the forward movement 26 does not occur at constant speed, such that the pushing movement 30 of the transfer device 18 or push bar 20 can gradually decelerate at least shortly before reaching the target position of the layer of articles 10 on the second conveyor module 14 in order to avoid sudden stops. The risk that some of the foremost articles 16 of the article group 10 slip or fall over when the group or layer of articles 10 rapidly decelerates or suddenly stops, in particular upon reaching a target position of the article group 10 can optionally be reduced using a support bar not shown here. Because the push bar 20 moves the layer of articles 10 relative to the support levels 22 and 24 of the first and second module 12, 14 on which the articles 16 slide, there is constant dynamic friction between the bottoms of the articles 16 and the support levels 24 and 26, which generates constant frictional resistance between the sliding surfaces. For this reason, abrupt slowing of the layer of articles 10 may result in individual articles 16 falling over or moving relative to the adjacent articles 16, which can be prevented by the optional support bar not shown in the drawings.

The schematic views of FIGS. 1-9 show consecutive steps of the transfer of a complete layer of articles 10 from the first conveyor module 12 to the vertically movable second conveyor module 14. In this exemplary embodiment, the first module 12 respectively shown on the left may consist, e.g., of a grouping system or supply area that supplies grouped layers of articles 10 one after another. These layers of articles 10, which are brought into the configuration of the layer of articles 10 shown by a sorting and/or grouping system not shown here, are then available on the grouping table or system. Such a grouping or sorting system may comprise, e.g., one or more handling robots forming cohesive layers 10 out of one or more article flows that are transferred, as shown, to the first conveyor module 12 or the grouping system. In the exemplary embodiment shown, neither the height nor the horizontal position of the grouping system is adjustable; rather, it can be arranged in a fixed position.

In order to reduce or bridge the gap 36 shown in FIGS. 1*a* and 1B between the first support level 22 of the first conveyor module 12 and the second conveyor module 14, the illustration of FIGS. 2*a* and 2B includes the horizontally movable second support level 24 or horizontally movable support table 32 in its first final position 38, which is maintained over the entire transfer process. Additionally, the support levels 22 and 24 are at the same height, such that continuous transfer of the layer of articles 10 is possible. To this end, the movable support table 32 is moved to the edge of the first support level 22 by means of the return movement 34 (FIGS. 1A and 1B).

Whilst the layer of articles 10 in FIGS. 1A and 1B is still on the first support level 22 and approaches the right edge of the first support level 22 and the gap 36 leading to the second support level 24 due to the pushing movement 30 of the push bar 20 of the transfer device 18 in the forward movement 26, the layer of articles 10 has already reached this edge in FIGS. 2A and 2B. However, the gap 36 is closed by the leftward movement of the support table 32 into the first final position 38, such that the forward movement 26 of FIG. 3A (top view) and FIG. 3B (side view) can be continued without obstruction. Thus, FIGS. 3A, 3B, 4A, 4B, 5A, and 5B are pairs of drawings (top views in FIGS. 3A, 4A, and 5A, as well as side views of FIGS. 3B, 4B, and 5B) an even transfer movement of the layer of articles to the second support level 24 or the support table 32 of the second conveyor module 14.

Figure 6A:
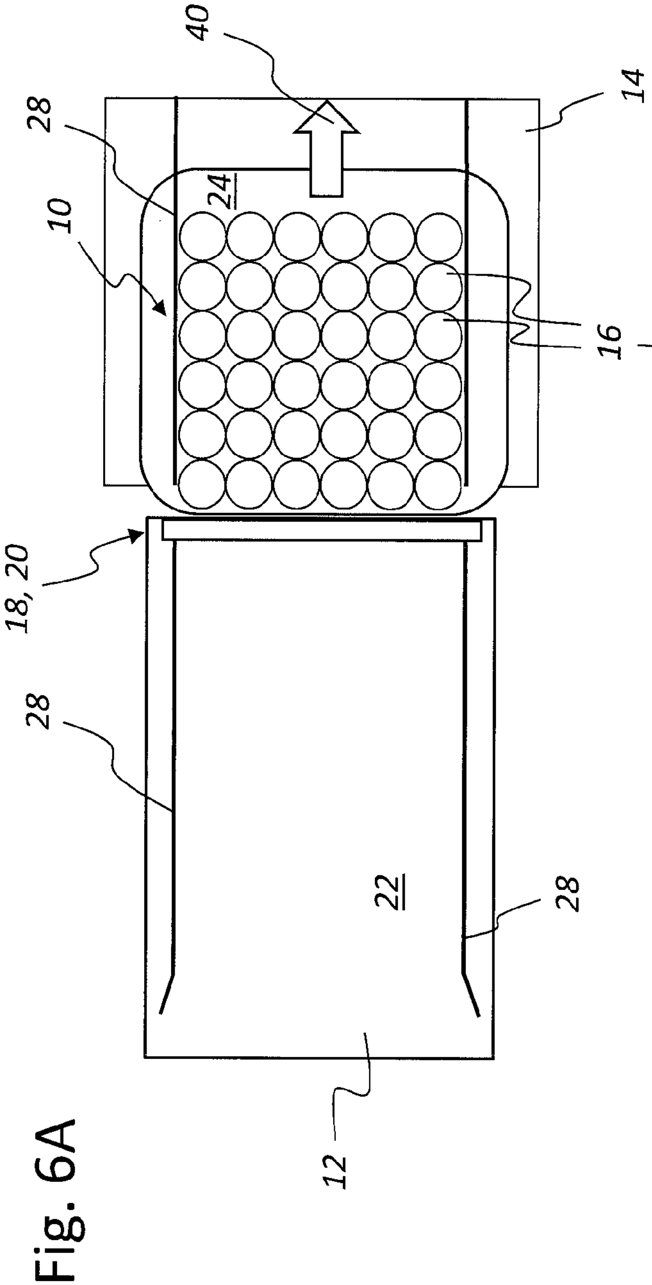
FIG. 6A shows a schematic view of the steps of the transfer of a layer of articles between two adjacent modules.
Figure 6B:
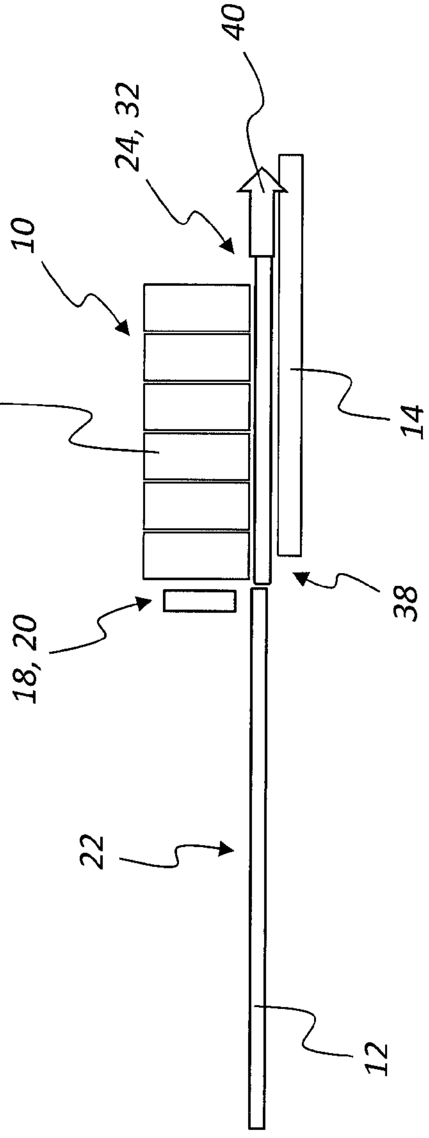
FIG. 6B shows a schematic view of the steps of the transfer of a layer of articles between two adjacent modules.

The two views of FIG. 6 (top view in FIG. 6A and side view in FIG. 6B) illustrate the positioning of the complete layer of articles 10 with all thirty six articles 16 on the second support level 24 or the support table 32. The push bar 20 has reached the right edge of the first conveyor module 12 or its first support level 22, and remains thus spatially associated with the first conveyor module 12, whilst the hindmost articles 16 of the layer of articles 10 are already completely on the support table 32. In this stage of the transfer, the pushing movement 30 of the push bar 20 ends, whilst a horizontal movement 40 of the support table 32 of the second support level 24 in the direction of transport and thus parallel to the direction of feed 26 of the layer of articles 10 can be initiated (cf. FIGS. 6A and 6B).

Decisive for the subsequent unobstructed, collision-free upward or downward hoisting movement of the second conveyor module 14 is the positioning of the push bar 20 of the transfer device 18 in its second final position, which does not extend into the outline of the second support level 24, but clearly remains associated with the first support level 22 of the first conveyor module 12. Independently of the positioning of the push bar 20 in the second final position thus defined, the horizontal pushing movement 40 of the movable support level 24 or the support table 32 may begin, as illustrated in FIGS. 6A and 6B. Optionally, the push bar 20 may be raised or lowered immediately after reaching the second final position in order to avoid (cf. FIG. 7B) a collision with any subsequent layer of articles 10 (not shown here) during the next return movement 44 (cf. FIG. 7A).

Figures 7A, 7B:
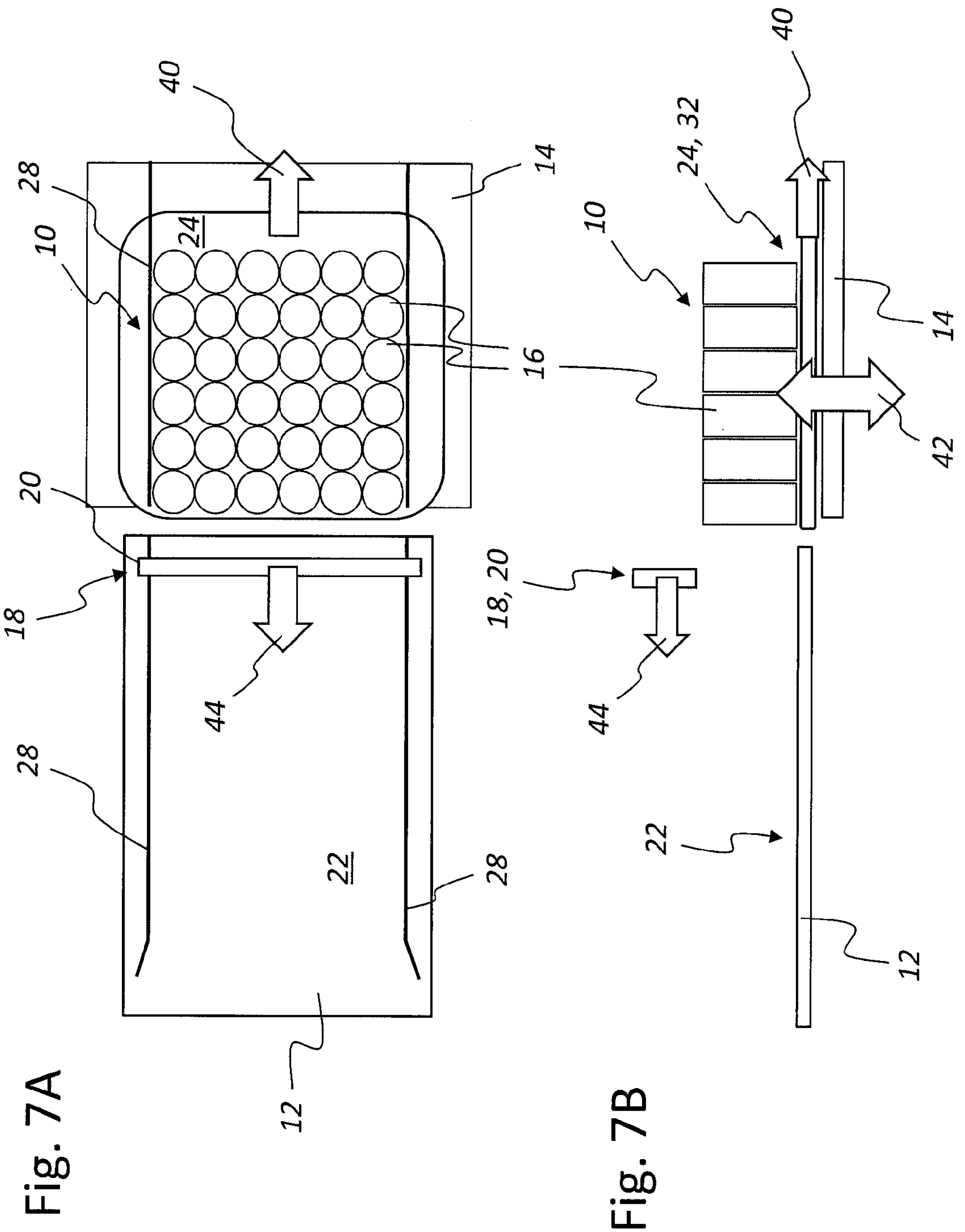
FIG. 7A shows a schematic view of the steps of the transfer of a layer of articles between two adjacent modules.
FIG. 7B shows a schematic view of the steps of the transfer of a layer of articles between two adjacent modules.
Figure 8A:
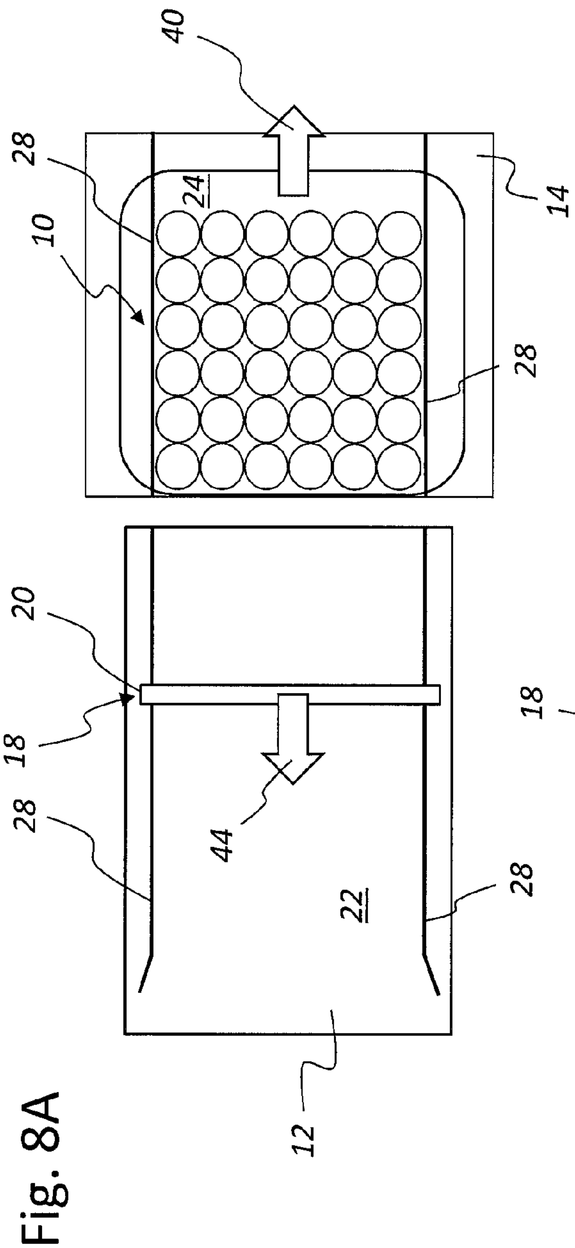
FIG. 8A shows a schematic view of the steps of the transfer of a layer of articles between two adjacent modules.
Figure 8B:
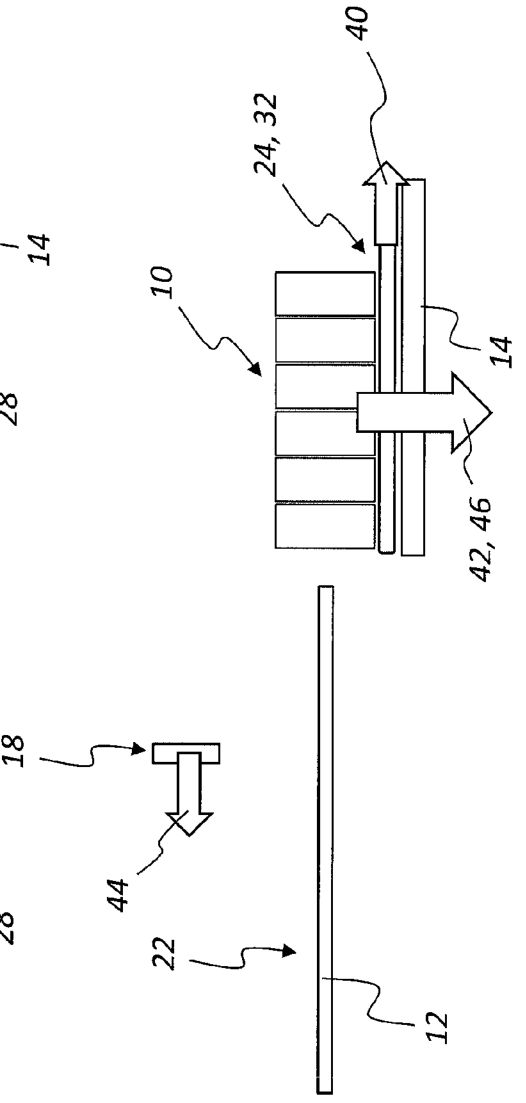
FIG. 8B shows a schematic view of the steps of the transfer of a layer of articles between two adjacent modules.
Figure 8C:
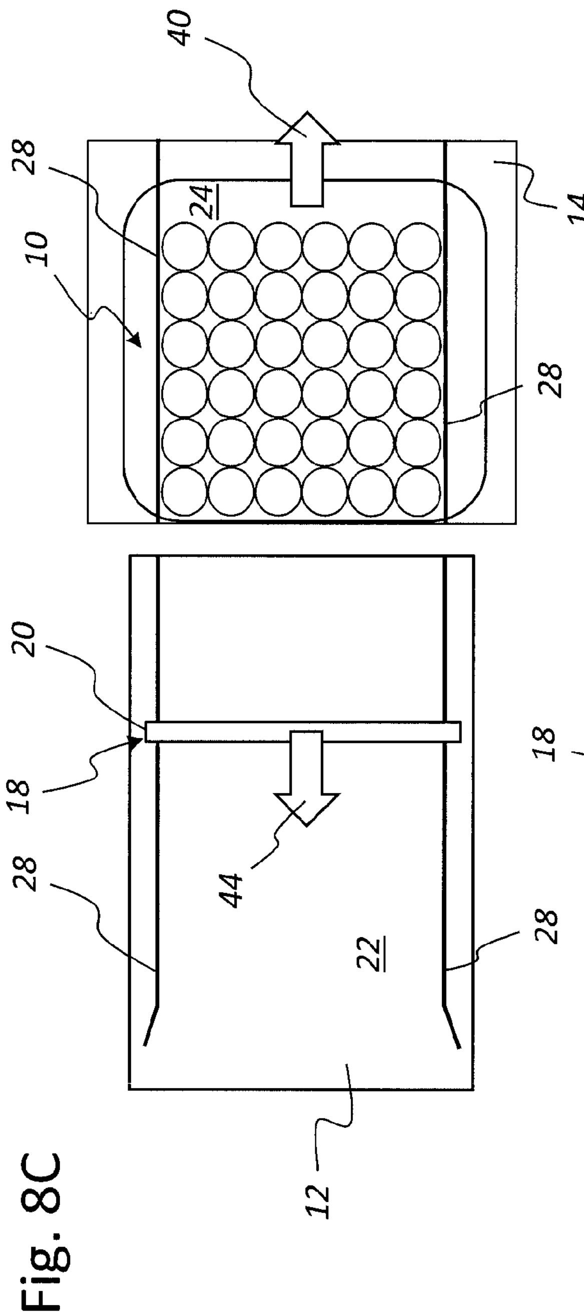
FIG. 8C shows a schematic view of the steps of the transfer of a layer of articles between two adjacent modules.
Figure 8D:
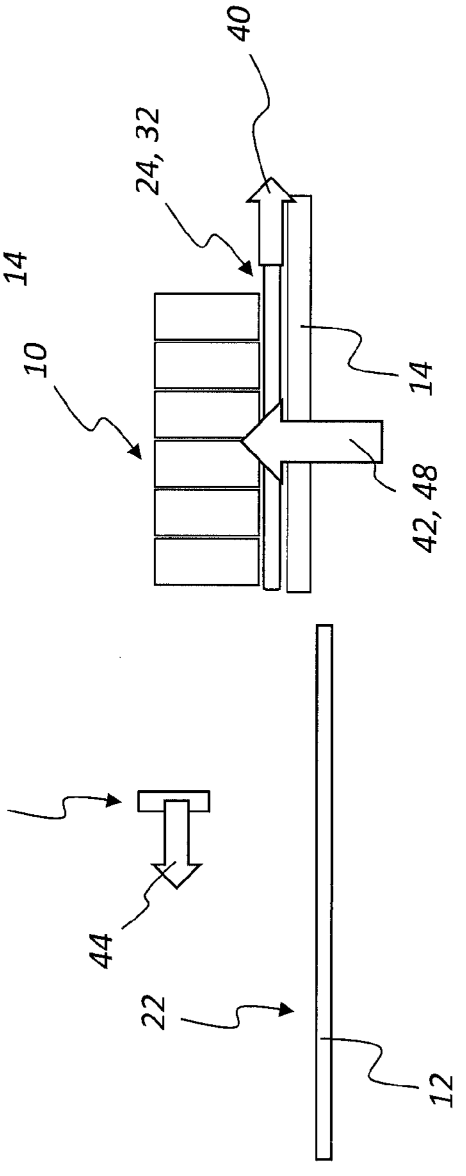
FIG. 8D shows a schematic view of the steps of the transfer of a layer of articles between two adjacent modules.

As can be seen in FIGS. 7A and 7B, simultaneously with this horizontal movement of the support table 32 and the layer of articles 10 thereon, hoisting movements 42 of the second conveyor module 14 together with the support table 32 and a return movement 44 of the push bar 20 of the transfer device 18 may be initiated. Optionally, the hoisting movement 42 of the second conveyor module 14 may be directed upward (lowering 46, cf. FIG. 8B) or upward (raising movement 48, cf. FIG. 8*d*), whilst the return movement 44 of the push bar 20 (FIGS. 8A, 8B, 8*c*, and 8*d*, and 9*a*, 9B, 9C, and 9D) and the horizontal movement 40 of the support table 32 to the right may each continue. Thus, FIG. 9A-9D show the completed horizontal movement 40 of the support table 32, which has reached its final position 50, in which the second support level 24 has reached a maximum horizontal distance from the first support level 22.

The return movement of the push bar 20 of the transfer device 18 may optionally occur as shown above the level of the subsequent layer of articles 10, which whilst not shown in FIGS. 7A and 7B, can already be positioned on the first conveyor level 22 of the first conveyor module 12. This return movement may generally also take place below the conveyor level 22, to the extent that this is more useful for reasons of design. An advantageous configuration may provide, e.g., that, in the interest of increasing the processing speed, two or more such transfer bars 20 may be arranged on an endlessly circulating pull drive and thus alternate in being prepared for the transfer of a layer of articles 10 to the second conveyor module 14 and for return 44 into the first final position.

FIGS. 7, 8, and 9 each illustrate the simultaneous hoisting movements 42 (lowering or raising movements 46, 48) of the second conveyor module 14 with the support table 32 on it and the second support level 24 moving horizontally between the two final positions 38 and 50, such that, on the one hand, any collision of the pushbar 20 with the second conveyor module 14 can be avoided without resulting in disadvantages for handling and conveyor speeds whilst depositing and/or palletising the layer of articles 10 on a deposit or stacking area (not shown). Such a transfer of the layer of articles 10 may occur, e.g., by means of a jalousie or plate gripper head that can unload a complete layer of articles 10 downward by opening or lateral movement of its moveable bottom.

After the layer of articles 10 has been delivered by the second conveyor module 14, e.g., in the deposit or stacking area, the second conveyor module 14 may again be positioned in a return movement (not shown here) according to FIG. 1, such that the support levels 22 and 24 are aligned. Simultaneously, the second support level 24 may be returned from the second 50 to the first final position during the return movement 34, such that another layer of articles 10 can be transferred between the two conveyor modules 12 and 14 as described.

Another variant of the stacking method, not shown here, may optionally provide for several layers of articles 10 to be deposited simultaneously on the loading station (the second conveyor module 14). By simultaneous handling and stacking of several layers of articles 10, pallet changing times can be significantly reduced. This allows the loading station to act as intermediate storage, allowing the necessary time for pallet changes to be minimised.

Additionally, it should be noted that the second, vertically movable conveyor module 14 may also have another transfer device, not shown here, in order to transfer the layer of articles 10 there to another conveyor module not mentioned here, e.g., a loading station. This additional transfer device associated with the second conveyor module 14 may have relatively small ranges of movement, because only complete transfer to another conveyor element or downward movement of the layer of articles 10 from the second conveyor module 14 is required. Optionally, this movement of the layer of articles 10 from the second conveyor module 14 may also occur during its vertical movement, in particular with another conveyor module, e.g., a loading station capable of corresponding vertical movements synchronised with the second conveyor module 14, which may be immediately downstream of the second conveyor module 14. In this case, the first conveyor module 12 is referred to as a supply or grouping module, whilst the second conveyor module 14 is referred to/deemed, in particular, as a transfer station or transfer module. A subsequent third conveyor module (not shown), the movements of which may be synchronised with or independent of the second conveyor module 14 may consist in this case of a loading station or loading module, etc. Optionally, the second conveyor module 14 and the third conveyor module (not shown here) may each have their own transfer devices to transfer the layer of articles 10 in the direction of transport.

The oscillating second support level 24 of the second conveyor module 14, accordingly, moves between the first conveyor module 12 and a third conveyor module (not shown) downstream of the second conveyor module 14 in the direction of transport, such that all gaps in the conveyor and support level between the individual modules can be compensated and bridged by the second support level 24, which is movable horizontally between its two final positions 38 and 50.

These movements of the second support level 24 may facilitate the transfer of the layer of articles 10 from the second conveyor module 14 to a third conveyor module, e.g., a loading station, during a synchronised vertical movement of the two conveyor modules.

An embodiment not shown here may provide for at least one more conveyor module in the direction of transport. Thus, the device may optionally extend to a third conveyor module, which may be immediately downstream of the second conveyor module 14 in the direction of transport. Thus the groups or layers of articles 10 may be moved from the vertically movable second conveyor module 14 to the vertically movable third conveyor module. The optional third conveyor module, which is vertically movable like the second conveyor module 14, may consist, in particular, or a loading station, etc., whilst the second conveyor module 14 may consist, e.g., of a transfer station. It may be provided here for the second conveyor module 14 and the third conveyor module to rest at the same vertical height during the transfer of the group or layer of articles 10 until the transfer has been completed. Optionally, however, it may also be provided for the second conveyor 14 module and the third conveyor module (not shown here) to carry out synchronised vertical movements in the same direction during the transfer of the group or layer of articles 10, such that, in this way, the loading station or third conveyor module can already prepare for a subsequent depositing process of the layer of articles, e.g., into a specifically prepared stacking area with a pallet located in it or on top of a layer of articles already deposited there.

The invention was described by reference to a preferred embodiment. However, persons skilled in the art will be aware that variations and modifications of the invention can be made without leaving the scope of the claims below.

REFERENCE NUMERALS

10 Layer or group of articles
12 First conveyor module

14 Second conveyor module
16 Articles, bundles, containers
18 Transfer device
20 Push bar
22 First support level (of the first conveyor module)
24 Second support level (of the second conveyor module)
26 Feed, forward movement
28 Lateral guide, guide rails
30 Pushing movement (push bar)
32 Support table
34 Return movement (of the second support level, support table)
36 Gap
32 Support table
34 Return movement
36 Gap
38 First final position
40 Horizontal movement
42 Hoisting movement
44 Return movement
46 Lowering movement
48 Raising movement
50 Second final position

The invention claimed is:

1. Method for horizontal movement (26) of groups or layers of articles (10) from a first support level (22) of a first conveyor module (12) to a vertically movable second support level (24) of a second conveyor module (14) immediately downstream of the first conveyor module (12) in the direction of transport or transfer, wherein the horizontal movement (26) of the groups or layers of articles (10) from the first support level (22) of the first conveyor module (12) to the vertically movable second support level (24) of the second conveyor module (14) is carried out by means of at least one transfer device (18) that remains spatially associated with the first conveyor module (12) such that the at least one transfer device (18) does not extend beyond an end of the first conveyor module (12) opposite the second conveyor module (14) during the transfer movement (26) and the respectively transferred group or layer of articles (10) is moved in the direction of transport on the second conveyor module (14) by a support surface (32) horizontally movable relative to this second conveyor module (14) and/or centred on the second conveyor module (14) before or during its vertical hoisting movement (42).

2. Method according to claim 1, in which a support level (24, 32) capable of horizontally moving and/or oscillating between two final positions (38, 50), which is located in its first final position (38) at the start of a transfer movement (26) of the group or layer of articles (10), which is closer to the first conveyor module (12) than a second final position (50), is associated with the second conveyor module (14).

3. Method according to claim 2, in which the horizontally movable support level (24, 32) is brought into the first final position (38), in which it approaches or contacts the first conveyor module (12), or at least partially abuts its surface, at least shortly before the beginning transfer process (26) of the group or layer of articles (10) to the second conveyor module (14).

4. Method according to claim 1, in which the horizontally movable support surface (24, 32) is moved towards a second final position (50) as the transfer device (18) approaches or reaches a margin of the first conveyor module (12) adjacent to the second conveyor module (14), thereby moving parallel to the direction of transfer (26).

5. Method according to claim 1, in which the groups or layers of articles (10) are movable from the vertically movable second conveyor module (14) to a vertically movable third conveyor module immediately downstream of the second conveyor module (14) in the direction of transport, and comprising a vertically movable loading station, wherein the second conveyor module (14) and the third conveyor module rest at the same vertical height, or execute synchronised vertical movements in the same direction during the transfer of the group or layer of articles (10).

6. Device for horizontal movement of groups or layers of articles (10) from a first support level (22) of a first conveyor module (12) to a vertically movable second support level (24) of a second conveyor module (14) immediately downstream of the first conveyor module (12) in the direction of transport or transfer, wherein the second support level (24, 32) is horizontally movable and/or oscillatable between two final positions (38, 50), and which is positioned immediately adjacent or near to the first conveyor module (12) in the first final position (38) and at at least a slight distance from the first conveyor module (12) and/or approximately centred relative to the second support level (24, 32) in the second final position (50) and wherein the end of the first conveyor module (12) facing the second support level (24) is a uniform, continuous edge and the edge of the second support level (24) facing the first conveyor module (12) is a uniform, continuous edge.

7. Device according to claim 6 having at least one transfer device (18) engaging the rear (in the direction of transport) of a group or layer of articles (10) to be transferred, which is spatially associated with the first conveyor module (12) and at least horizontally movable.

8. Device according to claim 6, in which the support level (24) of the second conveyor module (14) consists of a plate (32) movable horizontally between its two final positions (38, 50), having a surface corresponding at least to the base surface area of a group of articles (10) to be received.

9. Device according to claim 7, in which the transfer device (18) consists of a transfer bar (20) horizontally movable in the area of the first conveyor module (12), which is movable between two stop positions.

10. Device according to claim 9, in which at least the second stop position of the transfer bar (20) is within an outline of the first conveyor module (12).

11. Device according to claim 6, in which the horizontally movable second support level (24) has a support table (32) with a structured surface.

12. Device according to claim 6, in which a horizontal distance between the two final positions (38, 50) of the second support level (24) is between approximately 5 centimeters and approximately 25 centimeters.

13. Device according to claim 6, in which the vertically movable second conveyor module (14) is directly upstream in the direction of transport of a vertically movable third conveyor module, the third conveyor module comprising a vertically movable loading station.

14. Device for horizontal movement of groups or layers of articles (10) from a first support level (22) of a first conveyor module (12) to a vertically movable second support level (24) of a second conveyor module (14) immediately downstream of the first conveyor module (12) in the direction of transport or transfer, wherein the second support level (24, 32) is horizontally movable and/or oscillatable between two final positions (38, 50), and which is positioned immediately adjacent or near to the first conveyor module (12) in the first final position (38) and at least a slight distance from the first conveyor module (12) and/or approximately centered relative to the second support level (24, 32) in the second final position (50), and at least one transfer device (18) configured to engage the rear (in the direction of transport) of a group or layer of articles (10), wherein the at least one transfer device (18) is configured to be at least horizontally movable and remain spatially associated with the first conveyor module (12) such that the at least one transfer device (18) does not extend beyond an end of the first conveyor module (12) opposite the second conveyor module (14) during the transfer movement (26).

15. Device according to claim 14, in which the support level (24) of the second conveyor module (14) consists of a plate (32) movable horizontally between its two final positions (38, 50), having a surface corresponding at least to the base surface area of a group of articles (10) to be received.

16. Device according to claim 14, in which the transfer device (18) consists of a transfer bar (20) horizontally movable in the area of the first conveyor module (12), which is movable between two stop positions.

17. Device according to claim 16, in which at least the second stop position of the transfer bar (20) is within an outline of the first conveyor module (12).

18. Device according to claim 14, in which the horizontally movable second support level (24) has a support table (32) with a structured surface.

19. Device according to claim 14, in which a horizontal distance between the two final positions (38, 50) of the second support level (24) is between approximately 5 centimeters and approximately 25 centimeters.

20. Device according to claim 14, in which the vertically movable second conveyor module (14) is directly upstream in the direction of transport of a vertically movable third conveyor module, the third conveyor module comprising a vertically movable loading station.

* * * * *